3,047,631
DIALKYLHYDROXYBENZYL SULFONIUM SALTS
Albert L. Rocklin, Walnut Creek, Calif., assignor to Shell Oil Company, New York, N.Y., a corporation of Delaware
No Drawing. Filed Dec. 8, 1960, Ser. No. 74,464
5 Claims. (Cl. 260—607)

This invention relates to new hydroxybenzylsulfonium compounds. More particularly, it relates to novel 3,5-dialkyl-4-hydroxybenzylsulfonium salts.

Among the objects of this invention is that of providing new and useful 3,5-dialkyl-4-hydroxybenzylsulfonium compounds, e.g., the halides. Other objects will be apparent to one skilled in the art to which this invention pertains from the ensuing description thereof.

This invention provides, as new compositions, 3,5-dialkyl-4-hydroxybenzylsulfonium salts having the general formula

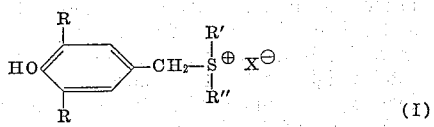

(I)

in which R represents an alkyl group containing from 3 to 8 carbon atoms and is branched on the alpha carbon atom thereof, R' and R'' each represents an organic radical comprising an alkyl, cycloalkyl, alkenyl, cycloalkenyl, aryl, aralkyl or alkaryl radical which may be the same or different, each of which may bear one or more simple substituents such as, for example, halo, hydroxy, alkoxy, aldo, keto, carboxy, carbalkoxy, cyano, amino or nitro groups, and X represents a common anion such as a nitrate, nitrite, triiodide, pentachlorophenate, stearate, or halide ion, e.g., chloride, bromide and iodide ions.

A preferred embodiment relates to 3,5-dialkyl-4-hydroxybenzylsulfonium salts, as above defined, in which each R is a tertiary alkyl group containing from 4 to 6 carbon atoms, each of R' and R'' is an unsubstituted organic radical comprising an alkyl, cycloalkyl, alkenyl, cycloalkenyl, aryl, aralkyl or alkaryl radical which may be the same or different and which contains only carbon and hydrogen atoms, and X is a common anion, preferably a halide, that is, a chloride, bromide, or iodide ion.

A specifically preferred class of compounds of the invention is the class of such 3,5-dialkyl-4-hydroxybenzylsulfonium salts in which each R is a tertiary butyl group, each R' and R'' is an unsubstituted alkyl radical containing from 2 to 18 carbon atoms, and X is a chloride, bromide, or iodide ion.

The compounds of the invention are useful in various applications, particularly as antioxidants in organic materials which are subject to oxidative deterioration, and are prepared from readily available starting materials. Typical organic materials which may be protected against oxidative deterioration by the antioxidants of this invention include, for example, natural and synthetic rubber, polymers, gasoline, motor oils, lubricating oils, fatty oils, drying oils, turbine oils, domestic heating oils, gear oils, cutting oils, transformer oils, brake fluids, paints, paper, asphalt, foods, and so forth. These antioxidant salts may be physically added to, or blended with, an organic material normally subject to oxidative deterioration to retard such deterioration. The amount of antioxidant which may be added to protect it against oxidation varies from 0.00001% by weight, based on the organic material, to about 10% by weight on the same basis. More or less of the antioxidant may be employed depending upon the particular antioxidant used, the nature of the organic material to be protected, and the environment in which the antioxidant and organic material find themselves.

Some of the sulfonium salts of the invention have other utilities based upon surface activity, germicidal properties, and the like, depending in part, in some instances, on the nature of the anion of the sulfonium salt, such as triiodide, pentachlorophenate, stearate, and so forth.

The sulfonium salts of the present invention, for the most part, are white crystalline solids. Most conveniently, the compounds of the preferred embodiments of this invention may be prepared by reacting (1) the corresponding 3,5-dialkyl-4-hydroxybenzyl halide with (2) a corresponding organic sulfide R'—S—R'' in which R' and R'' have the same significance as specified hereinbefore. This reaction is preferably carried out in a non-polar organic solvent which may be an excess of liquid organic sulfide reactant. The reaction temperature is from about 20° to about 75° C. It is preferred to conduct the process at or near room temperature, that is, within the range of from about 20° to 25° C. The reaction may be carried out at subatmospheric or superatmospheric pressure with atmospheric pressure being preferred.

In conducting the above process, the relative proportions of the two reactants can be varied. However, it may be advantageous to employ an excess of the organic sulfide in order to improve the yield of the desired salt, based on the benzyl halide compound. The addition reaction may be illustrated by the following equation:

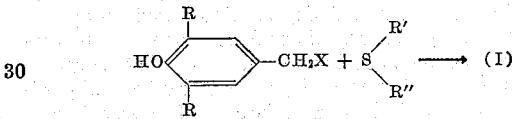

(I)

in which R, R', R'' and X are as above defined with reference to general Formula I.

The starting 3,5-dialkyl-4-hydroxybenzyl halide used to prepare the sulfonium salt may be prepared from the corresponding 3,5-dialkyl-4-hydroxybenzyl alcohol by reaction with the desired hydrogen halide in the presence of an appropriate organic solvent. The 3,5-dialkyl-4-hydroxybenzyl alcohol used to prepare the halide may be prepared by any one of several known methods, for example, the method disclosed by Coppinger and Campbell in JACS 75:734–736 (1953).

Representative organic sulfides which may be used to prepare the sulfonium salts include the unsubstituted symmetrical alkyl sulfides such as, for example, methyl sulfide, ethyl sulfide, propyl sulfide, i-propyl sulfide, butyl sulfide, i-butyl sulfide, s-butyl sulfide, t-butyl sulfide, amyl sulfide, i-amyl sulfide, hexyl sulfide, heptyl sulfide, octyl sulfide, decyl sulfide, undecyl sulfide and octadecyl sulfide; the unsubstituted symmetrical cycloalkyl sulfides such as, for example, cyclopentyl sulfide, cyclohexyl sulfide, cycloheptyl sulfide and m-methyl cycloheptyl sulfide; the unsubstituted symmetrical alkenyl sulfides such as, for example, vinyl sulfide, allyl sulfide, crotyl sulfide, 2-methyl-2-butenyl sulfide, hexenyl sulfide, and oleyl sulfide; the unsubstituted symmetrical cycloalkenyl sulfides such as for example, cyclopentenyl, 2-cyclohexenyl and 3-cyclohexenyl; the unsubstituted unsymmetrical alkyl sulfides such as, for example, methyl ethyl sulfide, i-propyl methyl sulfide, butyl methyl sulfide, i-butyl methyl sulfide, t-butyl methyl sulfide, amyl methyl sulfide, octyl methyl sulfide, cetyl methyl sulfide and dodecyl methyl sulfide; the unsubstituted unsymmetrical cycloalkyl sulfides such as, for example, methyl cyclopentyl sulfide, methyl cyclohexyl sulfide, methyl 3-methyl cyclohexyl sulfide, methyl 2-decahydronaphthalene sulfide, and cyclopentyl cyclohexyl sulfide; the unsubstituted unsymmetrical alkenyl sulfides such as, for example, methyl vinyl sulfide, methyl 2-methylallyl sulfide, ethyl vinyl sulfide, propylallyl sulfide, butyl crotyl sulfide and t-butyl-3-isopropenyl sulfide; the unsubstituted unsymmetrical cycloalkenyl sulfides such as, for example, methyl 2-cyclohexyl sulfide, amyl dihydronordicyclopentadienyl sulfide, cyclohexyl cyclohexenyl sulfide; the unsubstituted symmetrical aryl sulfides such as, for example, phenyl sulfide, alpha-naphthyl sulfide and beta-naphthyl sulfide; the unsubstituted symmetrical aralkyl sulfides such as, for example, benzyl sulfide, 1-phenylethyl sulfide; the unsubstituted unsymmetrical aralkyl sulfides such as, for example, benzyl methyl sulfide, benzyl ethyl sulfide, benzyl propyl sulfide, benzyl oleyl sulfide; the unsubstituted symmetrical alkaryl sulfides such as for example, o-tolyl, p-tolyl, p-tolyl methyl sulfide; and the unsubstituted unsymmetrical alkaryl sulfides such as, for example, phenyl o-tolyl sulfide, and p-phenyl p-tolyl sulfide.

Typical substituted organic sulfides include the halo-substituted sulfides such as, for example, methyl chloromethyl sulfide, methyl bromomethyl sulfide; the hydroxy-substituted sulfides such as, for example, beta-hydroxyethyl methyl sulfide, beta-hydroxyethyl ethyl sulfide; the alkoxy-substituted sulfides such as, for example, ethoxymethyl ethyl sulfide; and p-methoxyphenyl methyl sulfide; the aldo-substituted sulfides such as, for example, beta-methyl mercaptopropionaldehyde; the keto-substituted sulfides such as, for example, p-methyl mercaptoacetophenone; the carboxy and carbalkoxy-substituted sulfides such as, for example, ethyl mercaptoacetic acid, ethyl phenyl mercaptoacetate; the cyano-substituted sulfides such as, for example, beta-methyl mercaptopropionitrile, ethyl mercaptoacetonitrile; and the amino and nitro-substituted sulfides such as, for example, methyl 2-nitroethyl sulfide, 4-nitrodiphenyl sulfide, p-aminophenyl sulfide.

Still further typical organic sulfides which may be employed in the practice of this invention include the organic disulfides such as, for example, methyl disulfide, ethyl disulfide, propyl disulfide, and so forth. Moreover, it may be seen by those skilled in the art that the organic polysulfides ($R'-S_n-R''$) in which R' and R'' are any of the organic radicals disclosed herein and $n$ is a positive whole number may be employed in the practice of this invention.

The total number of carbon atoms in each organic radical R' and R'' may range from 1 to 18. The preferred total number of R' and R'' carbon atoms when unsubstituted is as follows: alkyl sulfides from 2 to 18 carbon atoms; cycloalkyl sulfides from 5 to 7 carbon atoms; alkenyl sulfides from 2 to 18 carbon atoms; cycloalkenyl sulfides from 5 to 6 carbon atoms; aryl sulfides from 6 to 10 carbon atoms; aralkyl sulfides from 7 to 9 carbon atoms; and alkaryl sulfides from 7 to 9 carbon atoms. The specifically preferred organic sulfides are the unsubstituted alkyl sulfides containing from 2 to 18 carbon atoms, and of this group the unsubstituted alkyl sulfides containing from 2 to 8 carbon atoms are most preferred.

A wide variety of inert non-polar organic solvents are suitable in the preparation such as, for example, ether, benzene, n-hexane, toluene, and the like. The liquid organic sulfides used to prepare the corresponding sulfonium salts are especially useful polar solvents for the reaction.

The salts of this invention and their preparation are illustrated by the following specific examples. It is to be understood that the examples are merely illustrative and are not to be regarded as limiting, since the basic teachings herein may be varied as will be understood by one skilled in the art to which this invention pertains.

EXAMPLE I.—3,5-DI-TERT-BUTYL-4-HYDROXYBENZYLDIMETHYL SULFONIUM BROMIDE

*Preparation.—3,5-Di-Tert-Butyl-4-Hydroxybenzyl Bromide*

To 118 grams (0.5 mole) of 3,5-di-tert-butyl hydroxybenzyl alcohol in 400 ml. of n-hexane was added 169 grams (1.0 mole) of 98% hydrobromic acid with stirring for one hour while the temperature was raised slowly to 55° C. The resulting n-hexane solution of 3,5-di-tert-butyl-4-hydroxybenzyl bromide was washed several times with water and dried over magnesium sulfate.

To the solution of 3,5-di-tert-butyl-4-hydroxybenzyl bromide, prepared as above, was added 50 ml. (about 0.85 mole) of dimethyl sulfide and the reaction mixture allowed to stand at room temperature. A white precipitate started to form within a few minutes. The mixture was left to stand for two days and then filtered. The voluminous solid obtained was washed with hexane, then transferred to a flask and dried in vacuo to a fluffy, slightly pink solid, weighing 53.7 grams.

ANALYSIS

| | C | H | S | Br |
|---|---|---|---|---|
| Calculated for $C_{17}H_{29}OSBr$ (M. W. 362) | 56.5 | 8.1 | 8.9 | 22.1 |
| Found | 56.7 | 8.1 | 8.9 | 21.2 |

On standing three more days the filtrate yielded another 12.3 grams of 3,5-di-tert-butyl-4-hydroxybenzyldimethyl sulfonium bromide. When the filtrate was replenished with another 50 ml. of dimethyl sulfide and allowed to stand for several days more, there was obtained a third portion of 3,5-di-tert-butyl-4-hydroxybenzyldimethyl sulfonium bromide, weighing 96.2 grams. The total weight of the three portions of 3,5-di-tert-butyl-4-hydroxybenzyldimethyl sulfonium bromide obtained was 162.2 grams (62.5% yield).

EXAMPLE II.—3,5-DI-TERT-BUTYL-4-HYDROXYBENZYLDIMETHYL SULFONIUM CHLORIDE

*Preparation.—3,5-Di-Tert-Butyl-4-Hydroxybenzyl Chloride*

In a manner similar to the preparation in Example I of 3,5-di-tert-butyl-4-hydroxybenzyl bromide, 3,5-di-tert-butyl-4-hydroxybenzyl chloride was prepared and the product recovered by evaporation of the solvent.

Five grams of 3,5-di-tert-butyl-4-hydroxybenzyl chloride, prepared as above, was dissolved in 15 ml. of dimethyl sulfide and the mixture allowed to stand at room temperature. A crystalline precipitate started to form within a few hours. The mixture was left to stand for two days and then filtered. The solid was washed with hexane, then transferred to a flask and dried in vacuo.

ANALYSIS

| | C | H | S | Cl |
|---|---|---|---|---|
| Calculated for $C_{17}H_{29}OSCl$ (M. W. 317.5) | 56.5 | 8.1 | 8.9 | 22.1 |
| Found | 56.7 | 8.1 | 8.9 | 21.2 |

Other representative sulfonium salts of the present invention are:

3-tert-butyl-5-isopropyl-4-hydroxybenzyldiisopropyl sulfonium bromide;

3-cyclohexyl-5-tert-butyl-4-hydroxybenzyldi-t-butyl sulfonium bromide;

3-isopropyl-5-tert-amyl-4-hydroxybenzyldiundecyl sulfonium chloride;

3,5-di-sec-octyl-4-hydroxybenzyldioctadecyl sulfonium bromide;

3-cyclohexyl-5-tert-butyl-4-hydrozybenzyldimethyl sulfonium triiodide;

3-isopropyl-5-tert-amyl-4-hydroxybenzyldiisopropyl sulfonium pentachlorophenate;

3-tert-butyl-5-isopropyl-4-hydroxybenzyldibutyl sulfonium stearate;

3-isopropyl-5-tert-butyl-4-hydroxybenzyldioctadecyl sulfonium bromide;

3-cyclohexyl-5-isopropyl-4-hydroxybenzyl dicycloheptyl sulfonium nitrate;

3-tert-butyl-5-isopropyl-4-hydroxybenzyldivinyl sulfonium nitrite;

3-tert-butyl-5-isopropyl-4-hydroxybenzyldioleyl sulfonium stearate;

3-isopropyl-5-isopropyl-4-hydroxybenzyldi-3-cyclohexenyl sulfonium chloride;
3-tert-butyl-5-tert-amyl-4-hydroxybenzyl-t-butyl-methyl sulfonium bromide;
3-tert-amyl-5-tert-amyl-4-hydroxybenzyldecylmethyl sulfonium chloride;
3-tert-butyl-5-tert-amyl-4-hydroxybenzylmethylethyl sulfonium bromide;
3-isopropyl-5-isopropyl-4-hydroxybenzylcyclopentylcyclohexyl sulfonium bromide;
3-tert-butyl-5-tert-amyl-4-hydroxybenzyldiphenyl sulfonium bromide;
3,5-di-tert-butyl-4-hydroxybenzyldibenzyl sulfonium bromide;
3,5-diisopropyl-4-hydroxybenzyldi-o-tolyl sulfonium bromide;
3,5-diisopropyl-4-hydroxybenzylmethylchloroethyl sulfonium bromide;
3,5-diisopropyl-4-hydroxybenzyl-beta-hydroxyethylmethyl sulfonium bromide;
3,5-diisopropyl-4-hydroxybenzylethoxymethylethyl sulfonium chloride;
3,5-di-tert-butyl-4-hydroxybenzylmethyl-2-nitroethyl sulfonium triiodide;

and the like.

A preferred embodiment of this invention is illustrated by such compounds as, for example, 3,5-di-tert-butyl-4-hydroxybenzyldiisoamyl sulfonium fluoride;
3,5-di-tert-butyl-4-hydroxybenzyldioctadecyl sufonium bromide;
3,5-di-tert-butyl-4-hydroxybenzyldicycloheptyl sulfonium chloride;
3,5-di-tert-amyl-4-hydroxybenzyldioleyl sulfonium iodide;
3,5-di-tert-amyl-4-hydroxybenzyldicrotyl sulfonium bromide;
3,5-di-tert-amyl-4-hydroxybenzyldicyclopentenyl sulfonium bromide;
3,5-di-tert-butyl-4-hydroxybenzyldiphenyl sulfonium chloride;
3,5-di-tert-amyl-4-hydroxybenzyldibenzyl sulfonium iodide;
3,5-di-tert-butyl-4-hydroxybenzylbenzylmethyl sulfonium bromide;
3,5-di-tert-butyl-4-hydroxybenzyldi-o-tolyl sulfonium chloride;

and the like.

A specifically preferred embodiment of this invention is illustrated by such compounds as, for example, 3,5-di-tert-butyl-4-hydroxybenzyldipropyl sulfonium bromide;
3,5-di-tert-butyl-4-hydroxybenzyldiisopropyl sulfonium iodide;
3,5-di-tert-butyl-4-hydroxybenzyldibutyl sulfonium chloride;
3,5-di-tert-butyl-4-hydroxybenzyldiisoamyl sulfonium bromide;
3,5-di-tert-butyl-4-hydroxybenzyldioctyl sulfonium iodide;
3,5-di-tert-butyl-4-hydroxybenzyldioctadecyl sulfonium bromide;
3,5-di-tert-butyl-4-hydroxybenzylmethylethyl sulfonium chloride;
3,5-di-tert-butyl-4-hydroxybenzyl-t-butylmethyl sulfonium chloride;

and the like.

I claim as my invention:

1. As a new composition of matter, a 3,5-dialkyl-4-hydroxybenzyl sulfonium halide having the formula:

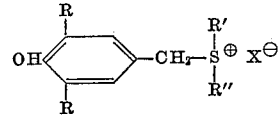

in which R represents an alkyl group containing from 3 to 8 carbon atoms and is branched on each alpha carbon atom thereof, R' and R" each represents an unsubstituted alkyl radical of 1 to 18 carbon atoms and X represents a halide anion selected from the group consisting of chloride, bromide and iodide ions.

2. As a new composition of matter, a 3,5-dialkyl-4-hydroxybenzyl sulfonium halide having the formula:

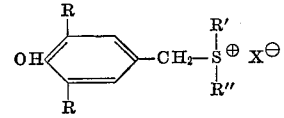

in which each R represents a tertiary alkyl group containing from 4 to 6 carbon atoms, R' and R" each represent an unsubstituted alkyl radical containing from 2 to 18 carbon atoms, and X represents a halide anion selected from the group consisting of chloride, bromide and iodide ions.

3. As a new composition of matter, a 3,5-dialkyl-4-hydroxybenzyl sulfonium halide having the formula:

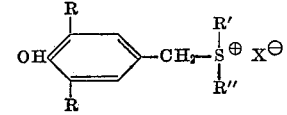

in which each R represents a tertiary butyl group, R' and R" each represents an unsubstituted alkyl radical containing from 2 to 8 carbon atoms, and X represents a halide anion selected from the group consisting of chloride, bromide and iodide ions.

4. As a new composition of matter, 3,5-di-tert-butyl-4-hydroxybenzyldimethyl sulfonium bromide.

5. As a new composition of matter, 3,5-di-tert-butyl-4-hydroxybenzyldimethyl sulfonium chloride.

No referenecs cited.